UNITED STATES PATENT OFFICE.

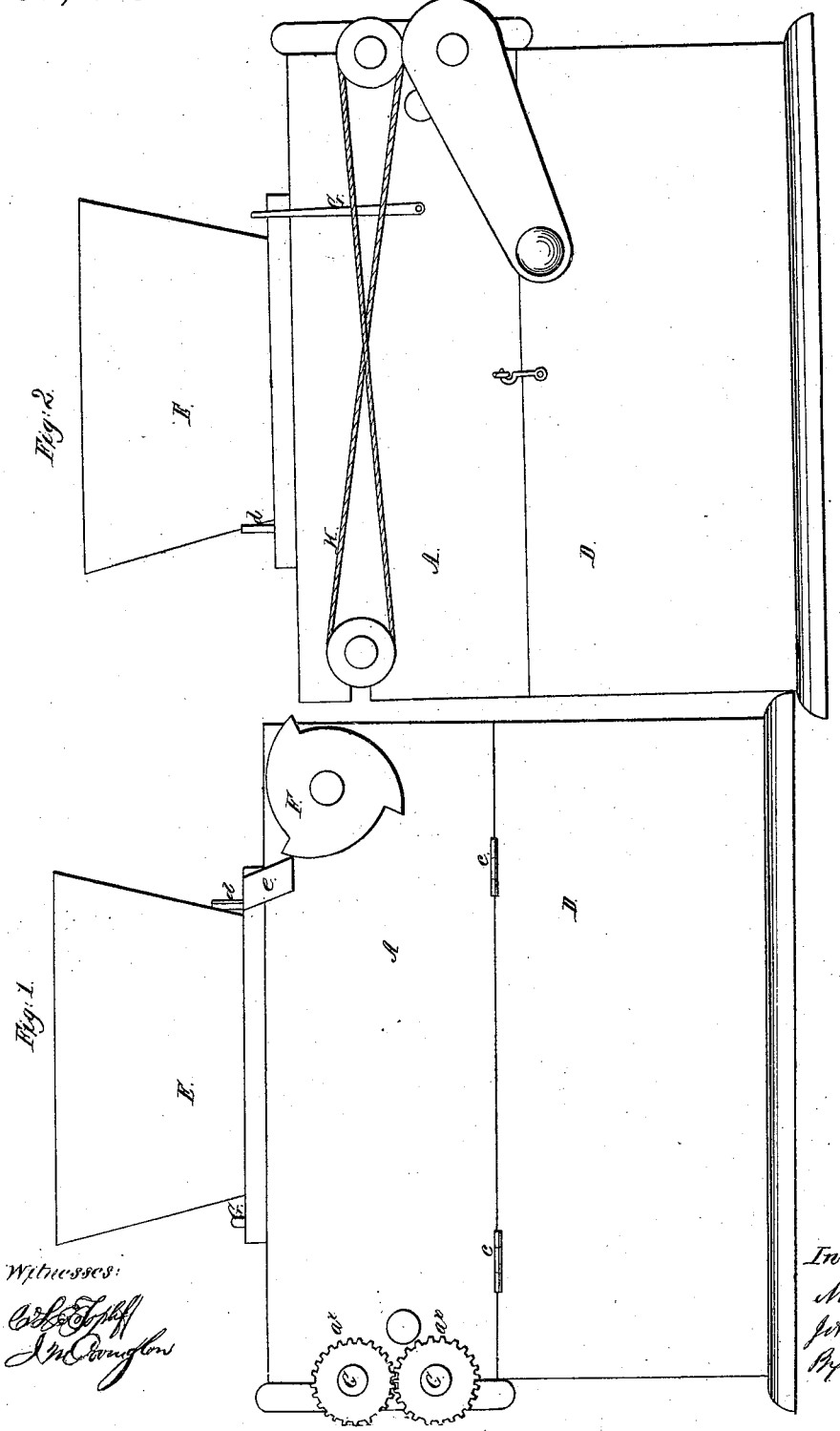

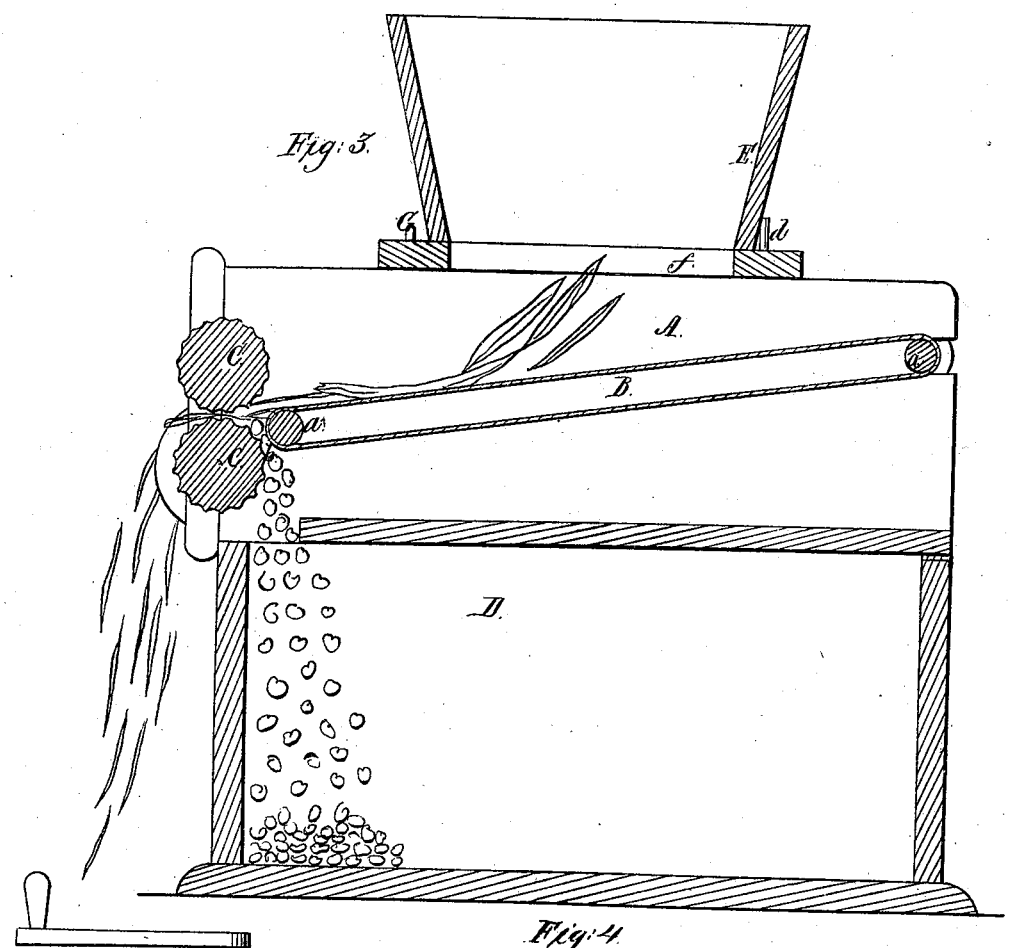
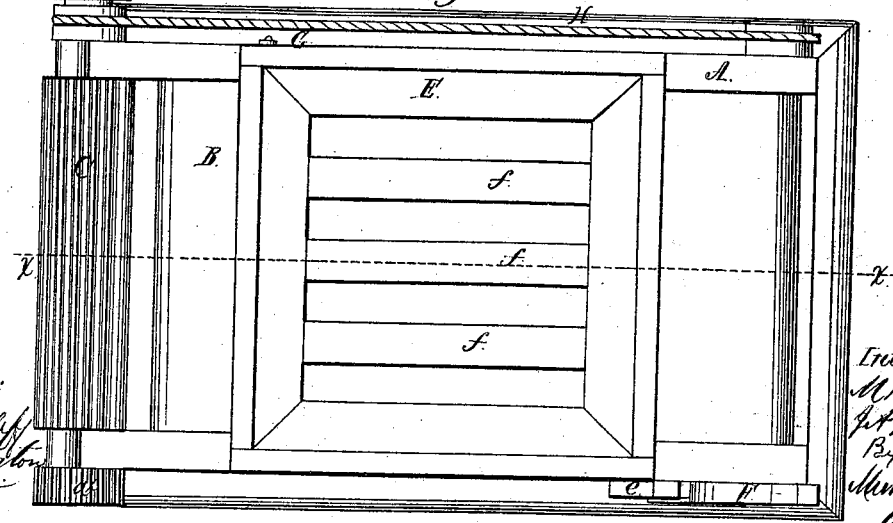

MELLEN BRAY, OF BOSTON, AND JOSEPH A. TALPEY, OF SOMERVILLE, ASSIGNORS TO WM. K. LEWIS, OF BOSTON, MASSACHUSETTS.

PEA-SHELLING MACHINE.

Specification forming part of Letters Patent No. 52,356, dated January 30, 1866.

*To all whom it may concern:*

Be it known that we, MELLEN BRAY, of Boston, in the county of Suffolk and State of Massachusetts, and JOSEPH A. TALPEY, of Somerville, Middlesex county, Massachusetts, have invented a new and Improved Machine for Shelling Pease; and we do hereby declare that the following is a full, clear, and exact description thereof, which will enable those skilled in the art to make and use the same, reference being had to the accompanying drawings, forming part of this specification, in which—

Figure 1, Sheet No. 1, is a side view of our invention. Fig. 2 is also a side view of the same, opposite or reverse to the side shown in Fig. 1; Fig. 3, Sheet No. 2, a side sectional view of the same, taken in the line $x\ x$, Fig. 2; Fig. 4, a plan or top view of the same.

Similar letters of reference indicate corresponding parts.

This invention relates to a new and improved machine for shelling pease, and is more especially designed for shelling green pease for family use, and also in large quantities for preserving in cans.

The invention consists in the employment or use of an endless apron with a pair of rollers, the apron conveying the pease to the rollers and the latter expelling the pease from the pods.

The invention further consists in a vibrating hopper for distributing the pease on the apron, and in a box for receiving the pease as they are forced out from the pods by the rollers.

A represents a box, in which an endless apron, B, is placed, slightly inclined, said apron working over rollers $a\ a$; and C C are two rollers, placed one over the other in the same axial plane, and having their bite in line with the upper surface of the lower or depressed part of the apron B, said rollers being connected at one end by gears $a^x$. These rollers C C may be of wood, metal, or other suitable material, and they may be fluted or corrugated longitudinally to give them a tooth to readily catch or grasp the pods. One of the rollers may, if desired or necessary, have its journals fitted in adjustable bearings, so as to regulate the space between the rollers in accordance with the size of the pods. The rollers are at the end of box A, adjoining the depressed part of the apron B, and a space, $b$, is allowed between said part of the apron and the rollers to admit of the pease, when ejected from the pods, passing down into a box, D, to which the box A is attached by hinges $c$.

E is a hopper, which is placed on the box A and secured thereto by a pin or pivot, $d$, at one side of its rear part, and at the opposite side of said part there is a projection, $e$, against which a cam, F, works, said cam being at one end of the rear roller, $a$, of the apron B. The hopper E has a spring, G, bearing against it at its front part, and at the side opposite to where the cam F works. By this arrangement a vibrating movement is given the hopper E, and the pease which are placed in the latter, are shaken down upon the apron between slats $f$, which form the bottom of the hopper, and which have a longitudinal position relatively with the apron, the movement of which causes the pods to be presented endwise to the bite of the rollers C C, between which they are drawn, the angle formed by the bite of the rollers being such as to expel the pease from the pods discharged at the outer side of the same.

This invention has been practically tested, and it performs its work rapidly and in a perfect manner, expelling all the pease from the pods without crushing or injuring the former in the least.

The power may be applied to the upper roller, C, from which the apron B is driven, by a belt, H, passing around a pulley at one end of the rear roller, $a$.

Having thus described our invention, we claim as new and desire to secure by Letters Patent—

1. The fluted or corrugated rollers C C, of about one inch or less in diameter, for expelling green pease or beans from their pods, when used in combination with the slots $b\ b$ for presenting the pods endwise to the rollers, as explained.

2. The endless apron B, in combination with the rollers C C, substantially as and for the purpose specified.

3. The vibrating hopper E, provided with a slatted bottom, in combination with the rollers C C and endless apron B, for the purpose set forth.

The above specification of our invention signed by us this 20th day of May, 1865.

MELLEN BRAY.
JOS. A. TALPEY.

Witnesses:
E. C. COMEY,
R. P. LONG.